US008950376B2

(12) United States Patent
Yamada (10) Patent No.: US 8,950,376 B2
(45) Date of Patent: Feb. 10, 2015

(54) MULTILINK-TYPE INTERNAL COMBUSTION ENGINE

(71) Applicant: Honda Motor Co., Ltd., Tokyo (JP)

(72) Inventor: Yoshikazu Yamada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 64 days.

(21) Appl. No.: 13/948,898

(22) Filed: Jul. 23, 2013

(65) Prior Publication Data
US 2014/0041621 A1 Feb. 13, 2014

(30) Foreign Application Priority Data

Aug. 9, 2012 (JP) .................................. 2012-176685

(51) Int. Cl.
*F02D 15/02* (2006.01)

(52) U.S. Cl.
USPC ..................... 123/197.4; 123/48 R; 123/78 R (58) Field of Classification Search
USPC ...... 123/48 R, 48 B, 197.1, 197.4, 78 R, 78 F
See application file for complete search history.

(56) References Cited

U.S. PATENT DOCUMENTS

| 7,121,251 | B2 * | 10/2006 | Moteki et al. | 123/197.1 |
| 8,397,683 | B2 * | 3/2013 | Hiyoshi et al. | 123/48 B |
| 2002/0043228 | A1 * | 4/2002 | Moteki | 123/78 E |
| 2005/0268870 | A1 * | 12/2005 | Hotta et al. | 123/78 F |
| 2006/0137629 | A1 * | 6/2006 | Mizuno et al. | 123/48 B |
| 2007/0056541 | A1 * | 3/2007 | Meintschel et al. | 123/90.17 |
| 2009/0241910 | A1 * | 10/2009 | Shin et al. | 123/48 B |

FOREIGN PATENT DOCUMENTS

| JP | 2005-069097 A | 3/2005 |
| JP | 2005-201127 A | 7/2005 |
| JP | 2007-239555 A | 9/2007 |

* cited by examiner

*Primary Examiner* — M. McMahon
(74) *Attorney, Agent, or Firm* — Westerman, Hattori, Daniels & Adrian, LLP (57) ABSTRACT

A multilink-type internal combustion engine includes a power transmission structure capable of transmitting rotation of a crankshaft to a pivot shaft. The power transmission structure comprises: a planet gear mechanism having a sun gear mounted on the crankshaft; a drive gear provided on a ring gear section of the planet gear mechanism; a driven gear mounted on the pivot shaft and meshing with the drive gear; and an adjustment mechanism for switching a rotation direction of a carrier of the planet gear mechanism to thereby adjust a meshing phase of the driven gear relative to the drive gear.

2 Claims, 11 Drawing Sheets

MULTILINK-TYPE INTERNAL COMBUSTION ENGINE

FIELD OF THE INVENTION

The present invention relates to multilink-type internal combustion engines where a connection link is mounted on a crankshaft, connected to a piston via a con rod and connected to a pivot shaft via a swing rod.

BACKGROUND OF THE INVENTION

Among the conventionally-known internal combustion engines are a premixed compression auto-ignition or self-ignition type in which a compression ratio in a combustion chamber is increased so that an air-fuel mixture supplied to the combustion chamber is automatically or spontaneously ignited by being compressed by a piston.

An example of such premixed-compression-self-ignition-type internal combustion engines is disclosed in Japanese Patent Application Laid-Open Publication No. 2005-69097 (Patent Literature 1), in which the air-fuel mixture can be ignited at a plurality of positions in the internal combustion engine and burned or combusted uniformly by being highly compressed to be automatically or spontaneously ignited. With such an increased compression ratio in the combustion chamber, the air-fuel mixture can be highly compressed and spontaneously ignited without use of an ignition plug (i.e., spark plug). However, with the internal combustion engine disclosed in Patent Literature 1, where the air-fuel mixture is automatically ignited without use of an ignition plug, it is difficult to stabilize the ignition timing.

As a means for stabilizing the self-ignition timing of the air-fuel mixture, it has been known to secure a negative overlap state where both an exhaust and an (air) intake valve are closed in an exhaust stroke to cause a part of combustion gas to remain in the combustion chamber so that heat energy of the remaining or residual gas can be used for combustion of the air-fuel gas. Namely, an internal EGR (Exhaust-Gas-Recirculation) mechanism is employed for mixing the residual combustion gas into the air-fuel mixture, so that the self-ignition timing of the air-fuel gas can be stabilized using the heat energy of the residual combustion gas in a compression stroke (see, for example, Japanese Patent Application Laid-Open Publication No. 2005-201127 (Patent Literature 2)).

However, in the exhaust stroke of such an internal combustion engine, the piston ascends to its top dead center or point with a part of the combustion gas remaining in the combustion chamber. Thus, because the remaining combustion gas is compressed by the piston until the piston reaches to its top dead center, a temperature of the remaining combustion gas would increase to get higher than a temperature of a cylinder wall. Therefore, heat loss from the cylinder wall would increase so that the remaining combustion gas may undesirably lower in temperature.

Further, as the reaches the top dead center in the exhaust stroke, a stress (load) would be generated from the remaining combustion gas to act on the piston by the remaining combustion gas being compressed by the piston. Therefore, the thus-generated stress is transmitted via the piston to the interior (particularly, sliding portions) of the internal combustion engine, so that friction may be produced in the interior of the internal combustion engine.

Further, Japanese Patent Application Laid-Open Publication No. 2007-239555 (Patent Literature 3), for example discloses a multilink-type internal combustion engine where a top dead center of the piston at the time of switching from the exhaust stroke to the intake stroke (i.e., exhaust top dead center) is set different from a top dead center of the piston at the time of switching from the compression stroke to the expansion stroke. In the internal combustion stroke disclosed in Patent Literature 3, the exhaust top dead center of the piston is set higher than the expansion top dead center of the piston. Thus, in the internal combustion engine disclosed in Patent Literature 3, the remaining combustion gas in the combustion chamber would be compressed by the piston more strongly than in the internal combustion engine disclosed in Patent Literature 2, so that heat loss of the remaining combustion gas and friction produced in the interior of the internal combustion engine cannot be effectively suppressed.

SUMMARY OF THE INVENTION

In view of the foregoing prior art problems, it is an object of the present invention to provide an improved multilink-type internal combustion engine which can effectively suppress heat loss of the remaining combustion gas and suppress friction from being produced in the interior of the internal combustion engine due to the remaining combustion gas.

In order to accomplish the above-mentioned object, the present invention provides an improved multilink-type internal combustion engine in which a connection link is pivotably mounted on a crankshaft and connected at one end portion thereof to a piston via a con rod and at another end portion thereof to a pivot shaft via a swing rod, and which includes a power transmission structure capable of transmitting rotation of the crankshaft to the pivot shaft. The power transmission structure comprises: a planet gear mechanism having a sun gear mounted on the crankshaft; a drive gear provided on a ring gear section of the planet gear mechanism; a driven gear mounted on the pivot shaft and meshing with the drive gear; and an adjustment mechanism for switching a rotation direction of a carrier of the planet gear mechanism to thereby adjust a meshing phase of the driven gear relative to the drive gear.

According to the present invention, the meshing phase of the driven gear relative to the drive gear can be adjusted by the adjustment mechanism switching the rotation direction of the planet gear mechanism (carrier). Thus, a top dead center in an exhaust stroke (i.e., exhaust top dead center) of the piston can be set at an opposite position, with respect to a combustion chamber, from a top dead center in a compression stroke (i.e., compression top dead center) of the piston; namely, the exhaust top dead center can be set at a lower position than the compression top dead center. By setting the exhaust top dead center of the piston at a lower position like this, the piston can be prevented from compressing residual combustion gas (combustion gas remaining in the combustion chamber) in the exhaust stroke. Thus, it is possible to suppress temperature increase of the residual combustion gas due to compression by the piston. As a consequence, it is possible to keep small a temperature difference between the residual combustion gas and a wall of a cylinder of a cylinder block and minimize heat loss from the cylinder (wall of the cylinder), so that an air-fuel mixture can be ignited spontaneously in a stabilized manner.

Further, because the piston can be prevented from compressing the residual combustion gas in the exhaust stroke, it is possible to prevent a load (stress) from being generated on the piston from the residual combustion gas. In this way, it is possible to suppress friction from being produced in the interior (particularly, sliding portions) of the combustion engine due to a load (stress) generated on the piston.

Because an air-fuel mixture can be ignited spontaneously (self-ignited) in a stabilized manner and friction can be suppressed from being produced in the interior of the internal combustion chamber, it is possible to enhance an operating efficiency of the internal combustion engine of the present invention.

Preferably, in the internal combustion engine of the present invention, the adjustment mechanism adjusts the meshing phase in such a manner that, during staring operation of the internal combustion chamber, the exhaust top dead center of the piston is set at the same position as the compression top dead center of the piston, and that, during steady operation of the internal combustion engine, a compression top dead center in the compression stroke of the piston is set at a position closer to the combustion chamber than the compression top dead center set during the starting operation, but also an exhaust top dead center in the exhaust stroke of the piston is set at an opposite position, with respect to the combustion chamber, from the compression top dead center set during the steady operation.

During the starting operation of the internal combustion engine, the exhaust top dead center of the piston is set at the same position as the compression top dead center of the piston, and thus, the air-fuel mixture can be ignited in a stabilized manner by means of an ignition plug (spark plug). As a result, it is possible to enhance the operating efficiency of the internal combustion engine of the present invention during the starting operation.

During the steady operation of the internal combustion engine, on the other hand, the exhaust top dead center of the piston is set at a lower position (at an opposite position, with respect to the combustion chamber, than (from) the compression top dead center set during the steady operation. Thus, the piston can be prevented from compressing the residual combustion gas in the exhaust stroke, so that it is possible to suppress temperature increase of the residual combustion gas. Therefore, it is possible to keep small the temperature difference between the residual combustion gas and the wall of the cylinder and minimize heat loss from the cylinder (wall of the cylinder). As a result, the air-fuel mixture can be ignited spontaneously in a stabilized manner. Further, because the piston can be prevented from compressing the residual combustion gas in the exhaust stroke, it is possible to prevent a load (stress) from being generated on the piston from the residual combustion gas. In this way, it is possible to suppress friction from being produced in the interior of the combustion engine due to a load (stress) generated on the piston.

Because the air-fuel mixture can be ignited spontaneously (self-ignited) in a stabilized manner and friction can be suppressed from being produced in the interior of the internal combustion chamber, it is possible to enhance the operating efficiency of the internal combustion engine of the present invention during the steady operation.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIG. 7A is a view explanatory of spark ignition operation and premixed compression self-ignition operation of the embodiment of the multilink-type internal combustion engine of the present invention, while

DETAILED DESCRIPTION OF THE INVENTION

Now, a description will be given about a multilink-type internal combustion engine 10 according to an embodiment of the present invention. The multilink-type internal combustion engine 10 is, for example, a 4-cycle, single-cylinder OHV engine which uses gas (urban gas, LP gas or the like) as fuel. Further, this internal combustion engine 10 is a utility engine for use as a drive source of power generators, agricultural machines, cogeneration apparatus, etc.

Figure 1:
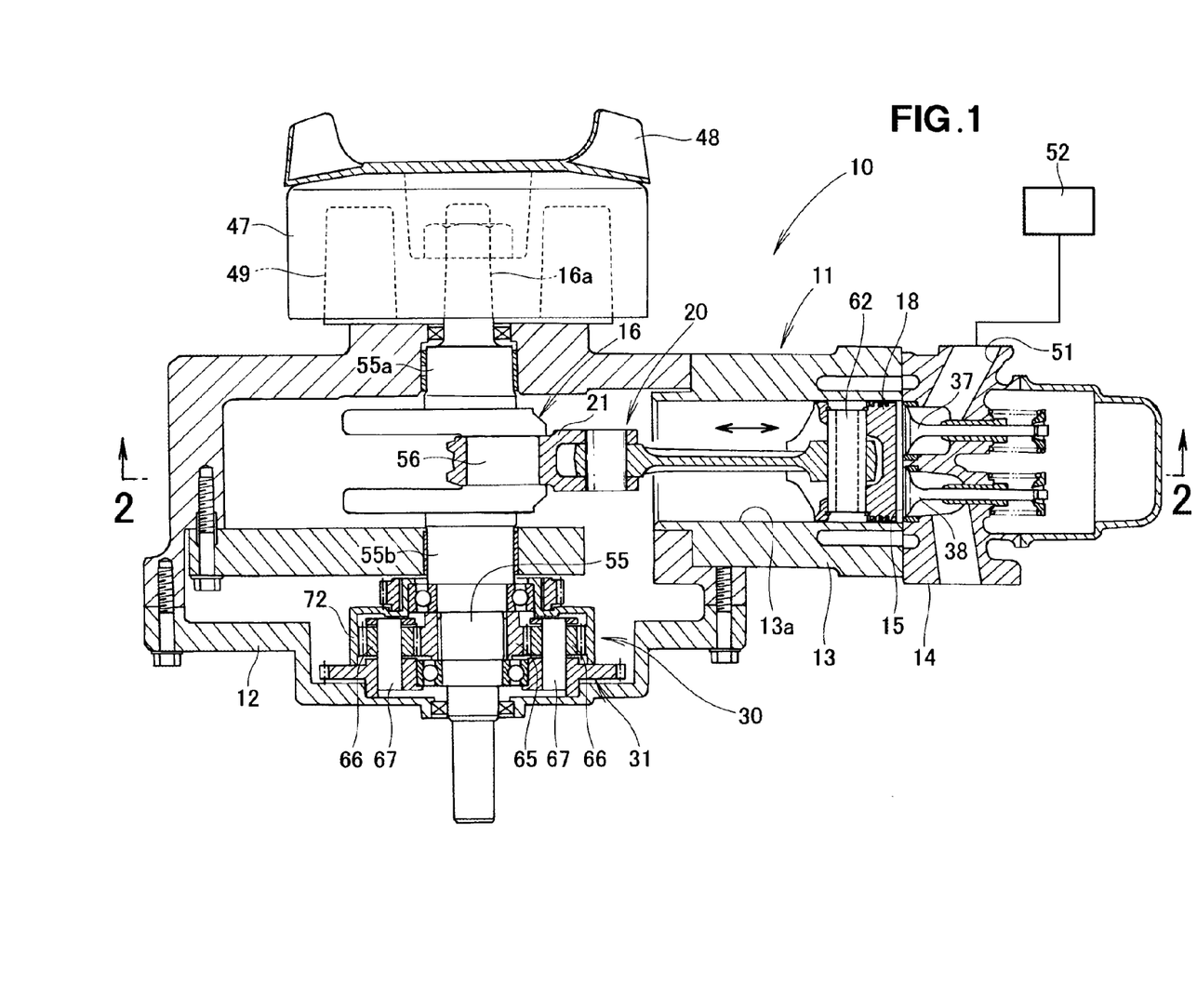
FIG. 1 is a sectional view showing a multilink-type internal combustion engine according to an embodiment of the present invention.

As shown in FIG. 1, the embodiment of the multilink-type internal combustion engine 10 includes: a crankshaft 16 provided in an engine case 11; a link mechanism 20 interconnecting the crankshaft 16 and a piston 18; and a power transmission structure 30 capable of changing the top dead center of the piston 18 by adjusting rotation of the link mechanism 20.

Further, the embodiment of the multilink-type internal combustion engine 10 includes: an (air) intake valve 37 and an exhaust valve 38 accommodated in a cylinder head 14; a valve (gear) mechanism 40 (FIG. 2) for actuating the intake valve 37 and the exhaust valve 38; and an ignition plug (spark plug) 46 (FIG. 2) accommodated in the cylinder head 14.

The crankshaft 16 has a cover 47 mounted on an end portion 16a thereof projecting beyond en engine case 11. A cooling fan 48 is provided on an outer portion of the cover 47, and a power generator 49 is accommodated in the cover 47.

The multilink-type internal combustion engine 10 is switchable, in response to an operating state thereof, between spark ignition operation and premixed compression self-ignition operation. The "spark ignition operation" means operation where an air-fuel mixture in a combustion chamber 15 is combusted by the ignition plug (spark plug) 46 (FIG. 2), and the premixed compression self-ignition operation means operation where the air-fuel mixture is ignited spontaneously by being compressed by the piston 18. For example, the spark ignition operation is selected during starting operation of the internal combustion engine 10, and the premixed compression self-ignition operation is selected during steady operation of the internal combustion engine 10.

The air-fuel mixture is generated by gas and air being mixed by a mixer 52 provided upstream of an intake path 51. The air-fuel mixture thus generated by the mixer 52 is supplied via the intake path 51 to the combustion chamber 15 when the intake valve 37 is in an open position.

Figure 2:
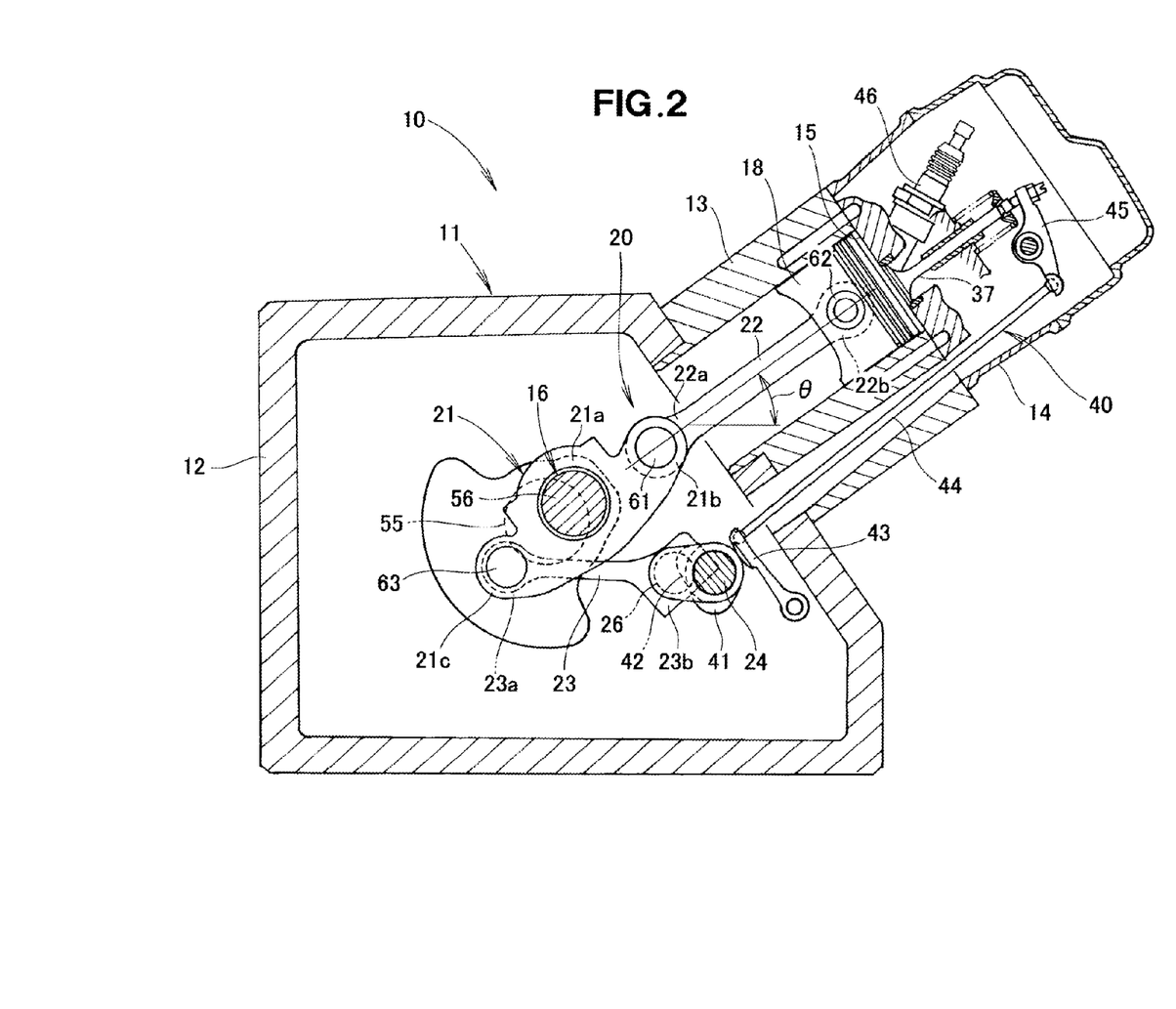
FIG. 2 is a sectional view taken along line 2-2 of FIG. 1.

As shown in FIG. 2, the valve mechanism 40 includes: first and second intake cams (only one of which is shown in the FIG. 41 mounted on a second shaft 24; first and second exhaust cams (only one of which is shown in the figure) 42; an intake lifter 43 that is selectively slidingly contacted by one of the first and second intake cams 41; and an exhaust lifter 42 that is selectively slidingly contacted by one of the first and second exhaust cams 42.

The valve mechanism 40 further includes an intake rocker arm 45 connected to the intake lifter 43 via an intake push rod 44, and an exhaust rocker arm connected to the exhaust lifter via an exhaust push rod.

The intake valve 37 is switchable between an open position and a closed position by actuating movement of the intake rocker arm 45, and the exhaust valve 38 is switchable between an open position and a closed position by actuating movement of the air exhaust rocker arm.

By the first and second intake cams 41 being moved in an axial direction of the pivot shaft 24, any one of the first and second intake cams 41 is selected to slidingly contact the intake lifter 43. Similarly, by the first and second exhaust cams 42 being moved in the axial direction of the pivot shaft 24, any one of the first and second exhaust cams 42 is selected to slidingly contact the exhaust lifter.

By causing the first intake cam 41 to slidingly contact the intake lifter 43 and causing the first exhaust cam 42 to contact the exhaust lifter during the starting operation, the intake valve 37 and the exhaust valve 38 are switchable between the open position and the closed position for the spark ignition operation of the internal combustion engine 10. On the other hand, by causing the second intake cam to contact the intake lifter and causing the second exhaust cam to contact the exhaust lifter during the steady operation, the intake valve 37 and the exhaust valve 38 are switchable between the open position and the closed position for the premixed compression self-ignition operation of the internal combustion engine 10.

In the premixed compression self-ignition operation, settings are made such that valve closing timing of the exhaust valve 38 is advanced while valve opening timing of the intake valve 37 is retarded. Thus, a so-called "negative overlap" state where both of the intake valve 37 and the exhaust valve 38 are closed is maintained from a latter half of an exhaust stroke to a former half of an intake stroke.

By thus maintaining the negative overlap state, the instant embodiment allows a part of combustion gas to remain in the combustion chamber 15, so that heat energy of the remaining gas (hereinafter referred to also as "residual combustion gas") can be used for the next combustion. Namely, the instant embodiment employs an internal EGR (Exhaust Gas Recirculation) mechanism for mixing the residual combustion gas of the combustion chamber 15 with an air-fuel mixture supplied to the combustion chamber 15, so that it can stabilize the self-ignition timing of the air-fuel mixture by use of the heat energy of the residual combustion gas.

In the spark ignition operation, on the other hand, the air-fuel mixture is combusted by the ignition plug 46, and thus, there is no need to use the heat energy of the combustion gas at the time of combustion of the air-fuel mixture. Thus, during the spark ignition operation, the valve closing timing of the exhaust valve 38 is set to occur when the piston 18 is near the top dead center of the exhaust stroke while the valve opening timing of the intake valve 37 is set to occur when the piston 18 is near the top dead center of the intake stroke. In this way, the combustion gas can be discharged from the combustion chamber 15 without being caused to remain in the combustion chamber 15.

Further, the first and second intake cams 41 and the first and second exhaust cams 42 of the valve mechanism 40 are mounted on the pivot shaft 24. Thus, the pivot shaft 24 can function also as a cam shaft supporting the first and second intake cams 41 and the first and second exhaust cams 42. Because there is no need to provide a separate cam shaft, it is possible to reduce the number of necessary components and thus reduce the size of the multilink-type internal combustion engine 10.

The following paragraphs describe in detail the link mechanism 20 and the power transmission structure 30 (FIG. 3) of the multilink-type internal combustion engine 10. As shown in FIG. 1, the engine case 11 includes; a crankcase 12 having accommodated therein the crankshaft 16, link mechanism 20 and power transmission structure 30, and a cylinder block 13 having a cylinder 13a communicating with the interior of the crankcase 12.

The cylinder 13a is inclined at an inclination angle θ (see FIG. 2), and the piston 18 is accommodated in the cylinder 13a for sliding movement in an arrowed direction.

The crankshaft 16 includes a shaft body section 55 with opposite shaft portions rotatably supported by the crankcase 12, and a crankpin 56 provided on a longitudinally-middle portion of the shaft body section 55. More specifically, the crankpin 56 is disposed parallel to the shaft body section 55 at a position eccentric to the shaft body section 55.

The piston 18 is accommodated coaxially in the cylinder 13a of the cylinder block 13 for sliding movement in an arrowed direction along the axis of the cylinder 13a.

Figure 3:
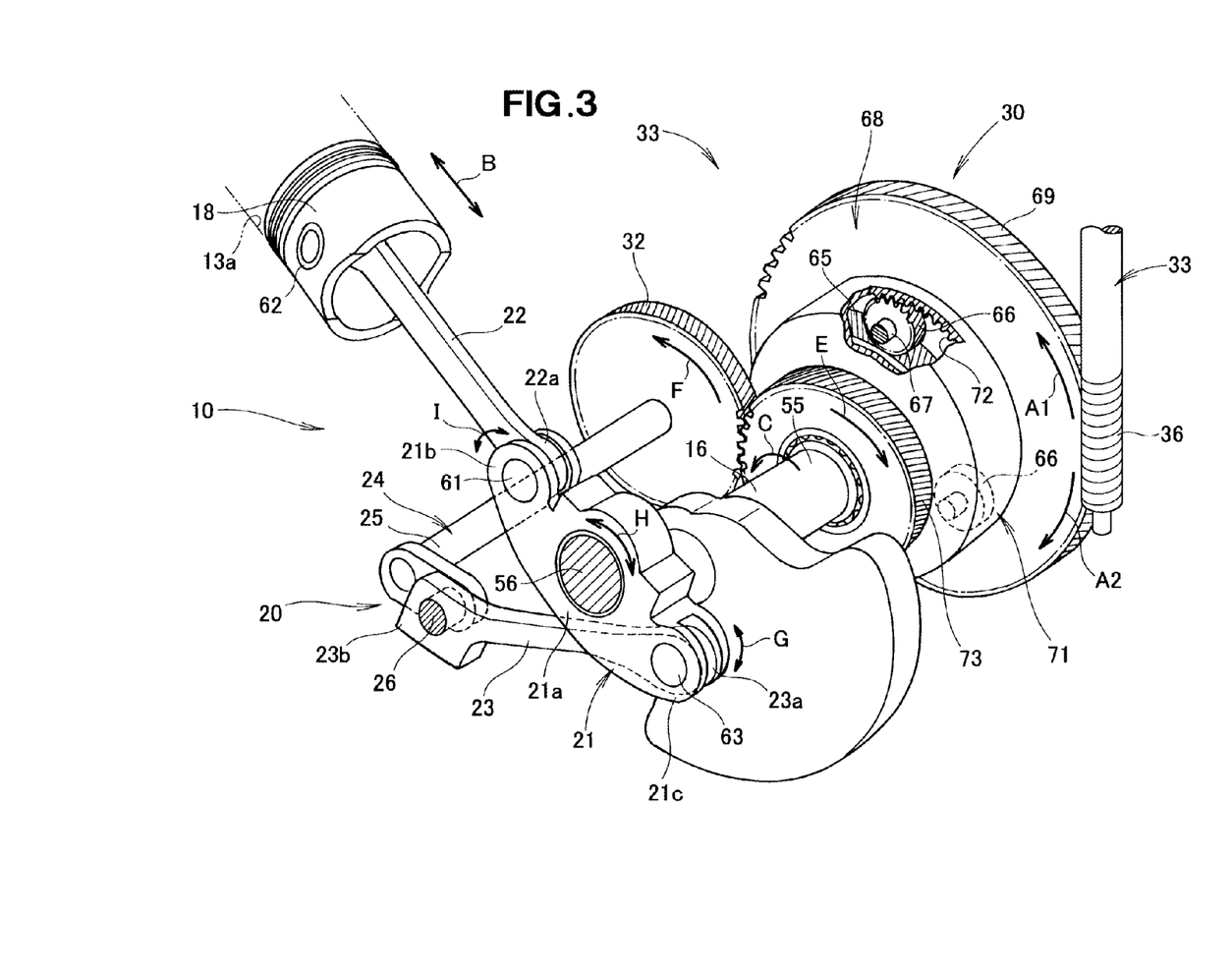
FIG. 3 is a perspective view showing the multilink-type internal combustion engine according to the embodiment of the present invention.

As shown in FIGS. 2 and 3, the link mechanism 20 includes: a connection link (trigonal link) 21 pivotably provided on the crankpin 56 of the crankshaft 16; a con rod (connecting rod) 22 connecting one end portion 21b to the connection link 21; a swing rod 23 connecting another end portion 21c of the connection link 21 to the pivot shaft 24; and a pivot shaft (eccentric shaft) 24 rotatably supported on the crankcase 12.

The connection link 21 integrally has a central portion 21a rotatably mounted on the crankpin 56, one end portion 21b provided on one side of the central portion 21a, and another end portion 21c provided on the other side of the central portion 21a.

The con rod 22 has its proximal end portion 22a rotatably connected to the one end portion 21b of the connection link 21 via a connection pin 61, and a distal end portion 22b rotatably connected to the piston 18 via a piston pin 62.

Further, the swing rod 23 has its proximal end portion 23a rotatably connected to the other end portion 21c of the connection link 21 via a connection pin 63, and a distal end portion 23b rotatably connected to a pivot pin 26 of the pivot shaft 24.

Figure 4:
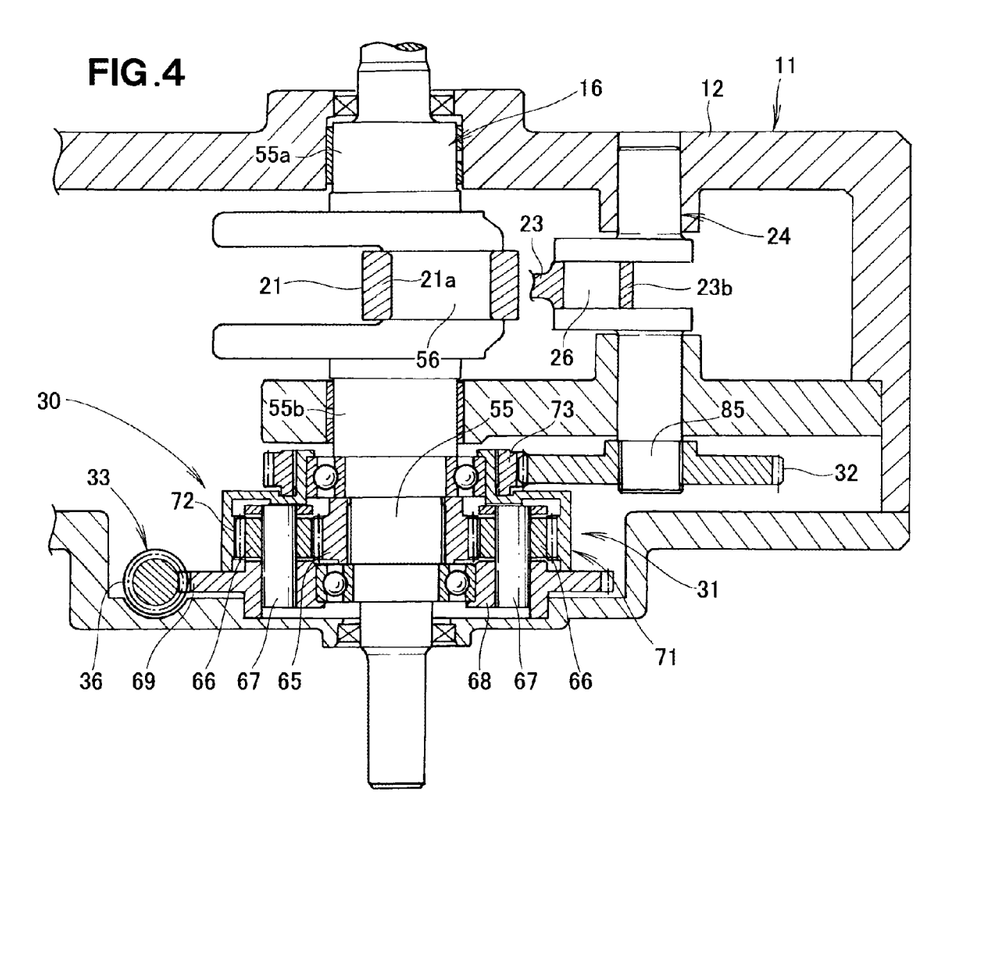
FIG. 4 is a sectional view showing a power transmission structure employed in the embodiment of the present invention.

Further, as shown in FIG. 4, the pivot shaft 24 includes a shaft body section 25 rotatably supported by the crankcase 12, and a pivot pin 26 provided on a longitudinally-middle portion of the shaft body section 25. More specifically, the pivot pin 26 is disposed parallel to the shaft body section 25 at a position eccentric to the shaft body section 25.

Further, as shown in FIGS. 3 and 4, the power transmission structure 30 includes: a planet gear mechanism 31 having a sun gear 65 mounted on the shaft body section 55 of the crankshaft 16; a driven gear 32 provided on the shaft body section 25 of the pivot shaft 24 (FIG. 4) meshing with a ring gear 72 of the planet gear mechanism 31; and an adjustment mechanism 33 capable of switching a carrier 68 of the planet gear mechanism 31 between a stationary state and a rotating state.

The planet gear mechanism 31 includes: the sun gear 65 mounted coaxially on the shaft body section 55 of the crankshaft 16; a plurality of planetary gears 66 disposed on and at intervals around the outer periphery of the sun gear 65 and meshing with the sun gear 65; the carrier 68 rotatably supporting the plurality of planetary gears 66 via planetary pins 67; and a ring gear section 71 meshing with the plurality of planetary gears 66.

Figure 5:
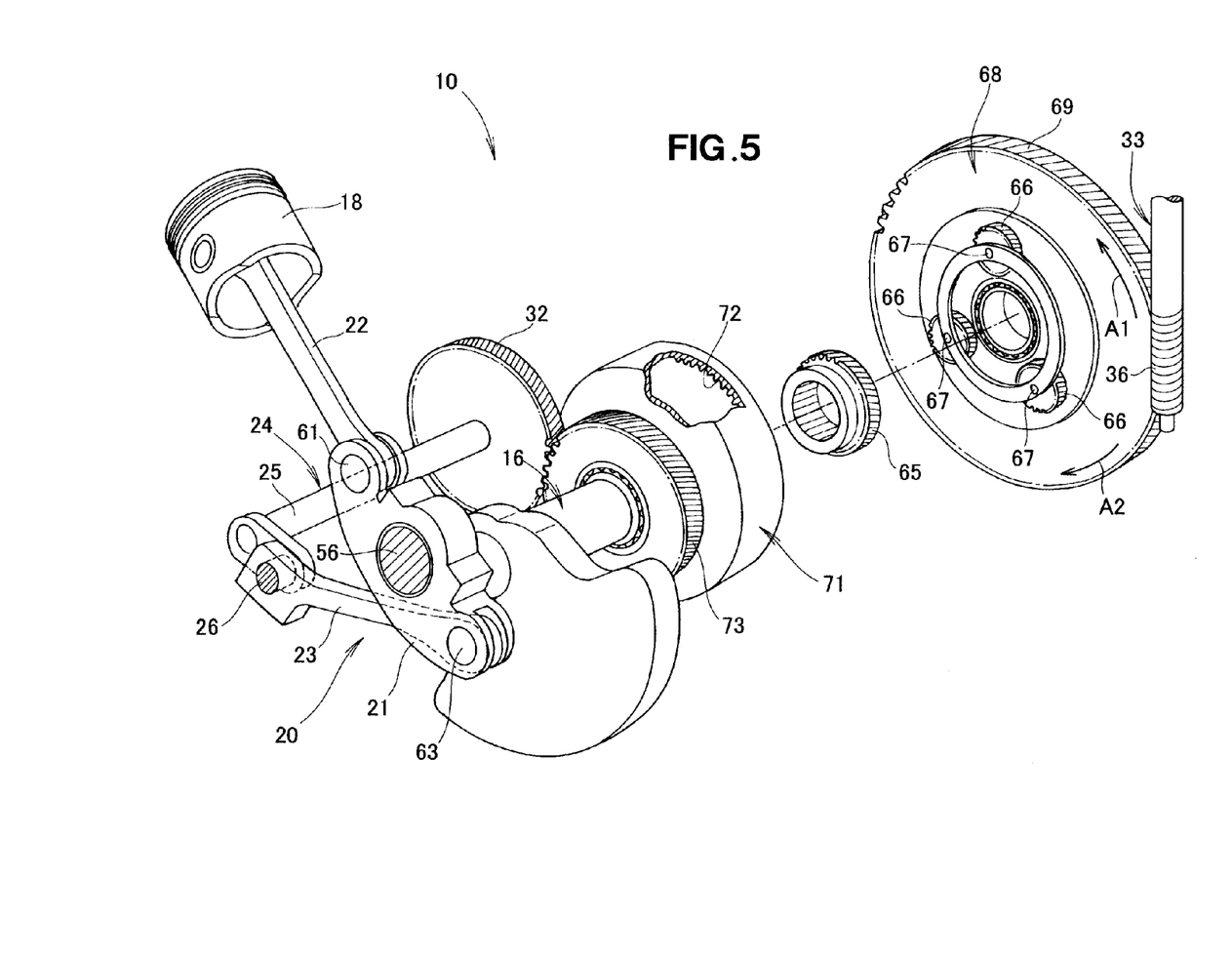
FIG. 5 is an exploded perspective view of the multilink-type internal combustion engine according to the embodiment of the present invention.
Figure 6:
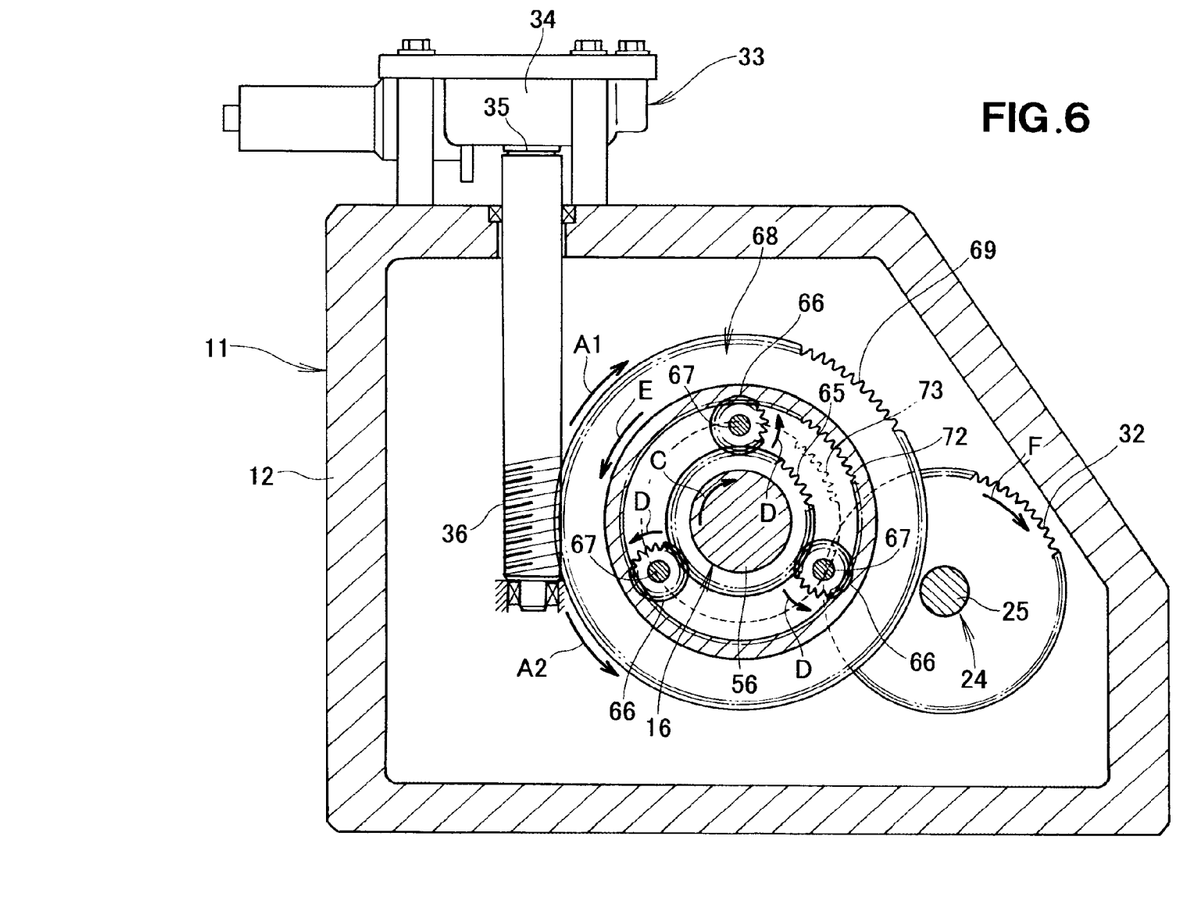
FIG. 6 illustrates the power transmission structure employed in the embodiment of the present invention.

Further, as shown in FIGS. 5 and 6, the carrier 68, which is formed in a disk shape having a central opening, includes the plurality of planetary pins 67 rotatably supporting the respective planetary gears 66, and an adjustment gear 69 formed on the outer periphery thereof. A drive pinion 36 of the adjustment mechanism 33 meshes with the adjustment gear 69 of the carrier 68.

Thus, deactivation of an electric motor 34 of the adjustment mechanism 33 can keep the adjustment gear 69 (i.e., carrier 68) in the stationary state. On the other hand, driving of the electric motor 34 of the adjustment mechanism 33 can keep the adjustment gear 69 (i.e., carrier 68) in the rotating state.

The above-mentioned ring gear section 71, which is formed in a generally cylindrical shape, includes the ring gear 72 formed on its inner peripheral wall, and a drive gear 73 formed on its outer peripheral wall. The ring gear 72 meshes with the plurality of planetary gears 66, and the drive gear 73 meshes with the driven gear 32.

The adjustment mechanism 33 includes the electric motor 34 mounted on the crankcase 12, and a drive pinion 36 provided coaxially with a drive shaft 35 of the motor 34 and meshing with the adjustment gear 69. The drive pinion 36 is kept in a stationary state by deactivation of the electric motor 34 and rotated by driving of the electric motor 34.

With the drive pinion 36 kept in the stationary state, the carrier 68 is kept in the stationary state. On the other hand, with drive pinion 36 kept in the rotating state, the carrier 68 is kept rotating in a direction of arrow A1 or A2.

The following describe, with reference to FIG. 6, behavior of the power transmission structure 30. As shown in FIG. 6, the carrier 68 is kept in the stationary state by the electric motor 34 of the adjustment mechanism 33 being kept in the deactivated state. With the carrier 68 kept in the stationary state like this, the plurality of planetary pins 67 are kept in a stationary state.

The crankshaft 16 rotates in a direction of arrow C in response to the piston 18 sliding in a direction of arrow B (see FIG. 3). In response to the crankshaft 16 rotating in the direction of arrow C, the sun gear 65 rotates in the direction of arrow C, so that the plurality of planetary gears 66 each rotate in a direction of arrow D by a predetermined number of rotations N1 without revolving around the sun gear 65.

In response to the plurality of planetary gears 66 rotating in the direction of arrow D as above, the ring gear 72 (i.e., ring gear section 71) rotates in a direction of arrow E about the crankshaft 16, so that the drive gear 73 of the ring gear section 71 rotates in the direction of arrow E about the crankshaft 16. In response to the drive gear 73 rotating in the direction of arrow E, the driven gear 32 rotates in a direction of arrow F, so that the pivot shaft 24 rotates in the direction of arrow F by a predetermined number of rotations N2.

Namely, by causing the crankshaft 16 to rotate in the direction of arrow C with the carrier 68 kept in the stationary state, the power transmission structure 30 can cause the pivot shaft 24 to rotate in the direction of arrow F by the predetermined number of rotations N2.

Then, the electric motor 34 of the adjustment mechanism 33 is activated from the aforementioned state, so that the carrier 68 is rotated in the direction of arrow A1 by means of the drive pinion 36. In response to such rotation of the carrier 68, the plurality of planetary gears 66 revolve in the direction of arrow A1; more specifically, the plurality of planetary gears 66 revolve in the direction of arrow A1 but also rotate in the direction of arrow D by a predetermined number of rotations N3. Namely, by causing the plurality of planetary gears 66 to revolve in the direction of arrow A1, the planetary gears 66 can be adjusted into the number of rotations N3 smaller than the number of rotations N1.

In response to the plurality of planetary gears 66 rotating in the direction of arrow D by the predetermined number of rotations N3 as above, the pivot shaft 24 rotates in the direction of arrow F by a predetermined number of rotations N4, via the ring gear 72, drive gear 73 and driven gear 32, which is smaller than the number of rotations N2.

Namely, by causing the carrier 68 to rotate in the direction of arrow A1, the power transmission structure 30 can cause the pivot shaft 24 to rotate in the direction of arrow F by the number of rotations N4 smaller than the number of rotations N2.

By driving of the electric motor 34 of the adjustment mechanism 33, the carrier 68 is caused to rotate in the direction of arrow A2 via the drive pinion 36, so that the plurality of planetary gears 66 revolve in the direction of arrow A2. Namely, the plurality of planetary gears 66 revolve in the direction of arrow A2 but also rotate in the direction of arrow D by the number of rotations N5 greater than the number of rotations N1. Namely, by causing the plurality of planetary gears 66 to revolve in the direction of arrow A2, the power transmission structure 30 can be adjusted into the number of rotations N5 greater than the number of rotations N1.

In response to the plurality of planetary gears 66 rotating in the direction of arrow D by the predetermined number of rotations N5 as above, the pivot shaft 24 rotates in the direction of arrow F by a predetermined number of rotations N6, via the ring gear 72, drive gear 73 and driven gear 32, greater than the number of rotations N2.

Namely, by causing the carrier 68 to rotate in the direction of arrow A2, the power transmission structure 30 can cause the pivot shaft 24 to rotate in the direction of arrow F by the number of rotations N6 greater than the number of rotations N2.

By the rotation direction of the planetary gear mechanism 31 (carrier 68) being switched by the adjustment mechanism 33 between the direction of arrow A1 and the direction of arrow A2 as set forth above, the number of rotations of the driven gear 32 can be adjusted as desired.

In the aforementioned manner, it is possible to adjust the rotations of the first and second intake cams 41 and the first and second exhaust cams 42 mounted on the pivot shaft 24. Further, by changing the number of rotations of the carrier 68, it is possible to adjust as desired the meshing phase γ of the driven gear 32 relative to the drive gear 73.

The following describe, with reference to FIG. 3, behavior of the link mechanism 20 in the instant embodiment. In response to the crankshaft 16 rotating in the direction of arrow C as shown in FIG. 3, the crankpin 56 rotates (revolves) in the direction of arrow C about the shaft body section 55. In response to such rotation of the shaft body section 55, the connection link 21 rotates (revolves) in the direction of arrow C together with the shaft body section 55.

Further, the pivot shaft 24 is rotated by the power transmission mechanism 30 in the direction of arrow F, in response to which the pivot pin 26 rotates (revolves) in the direction of arrow F about the shaft body section 25. In response to such rotation of the pivot pin 26, the distal end portion 23b of the swing rod 23 rotates (revolves) in the direction of arrow F together with the pivot pin 26.

Further, in response to such revolution of the distal end portion 23b of the swing rod 23, the other end portion 21c of the connection link 21 moves in a direction of arrow G together with the proximal end portion 23a of the swing rod 23, so that the connection link 21 pivots in a direction of arrow H about the crankpin 56.

Further, in response to such pivoting movement of the connection link 21, the one end portion 21b of the connection link 21 moves in a direction of arrow I, so that the proximal end portion 22a of the con rod 22 moves in the direction of arrow I. By such movement of the proximal end portion 22a of the con rod 22, it is possible to change (adjust) the top dead center of the piston 18.

In such states, it is possible to adjust the meshing phase γ of the driven gear 32 relative to the drive gear 73 by switching the rotation direction of the planetary gear mechanism 31 (carrier 68) between the direction of arrow A1 and the direction of arrow A2.

Figure 7A:
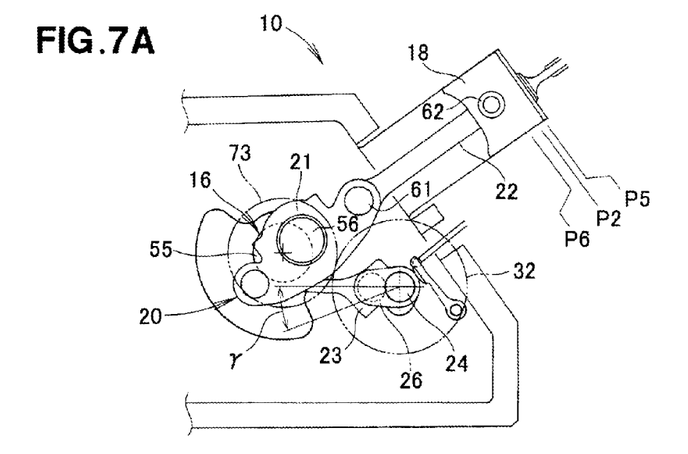
Figure 7B:
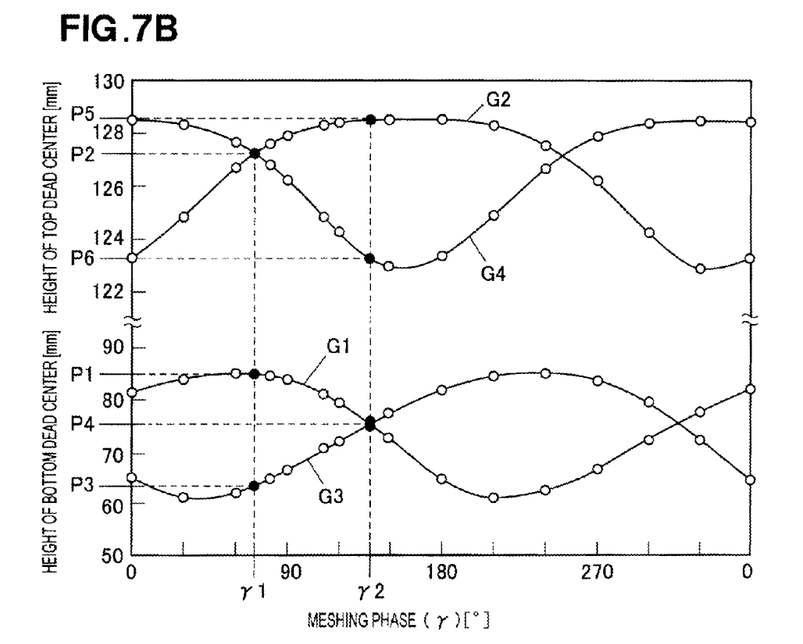
FIG. 7B is a graph explanatory of the spark ignition operation and premixed compression self-ignition operation of the embodiment of the multilink-type internal combustion engine of the present invention.

The following paragraphs describe, with reference to FIGS. 3 and 7, a manner in which the meshing phase γ is adjusted to switch the internal combustion engine 10 to the starting operation (i.e., spark ignition operation) or to the steady operation (i.e., premixed compression self-ignition operation) and in which the top dead center of the piston 18 is changed in the steady operation.

FIG. 7A is a view explanatory of the spark ignition operation and premixed compression self-ignition operation of the embodiment of the multilink-type internal combustion engine of the present invention. FIG. 7B is a graph showing relationship among the meshing phase γ, height of the top dead center and height of the bottom dead center of the embodiment of the multilink-type internal combustion engine 10, where G1 represents the bottom dead center of the intake stroke, G2 represents the top dead center of the compression stroke, G3 represents the bottom dead center of the expansion stroke and G4 represents the top dead center of the exhaust stroke. Further, in FIG. 7B, the vertical axis represents the heights of the bottom and top dead centers while the horizontal axis represents the meshing phase γ. Note that the meshing phase γ refers to a phase at which the driven gear 32 on the pivot shaft 24 meshes with the drive gear 73 on the shaft body section 55 of the crankshaft 16.

As an example, in the embodiment of the multilink-type internal combustion engine 10, link ratios of the link mechanism 20 and gear ratios of the power transmission structure 30 are set in such a manner that, when the carrier 68 of the power transmission structure 30 rotates in the direction of arrow A1, the meshing phase is set at γ1 (see FIG. 7B). With the meshing phase set at γ1 like this, the starting operation (spark ignition operation) can be selected.

As shown in FIG. 7, the bottom dead center in the intake stroke (intake bottom dead center) is set at P1 in response to the meshing phase being at γ1. Further, the top dead centers of the piston 18 in the compression stroke and exhaust stroke (i.e., compression top dead center and exhaust top dead center) of the piston 18 are set at the same position P2, and the bottom dead center in the expansion stroke (expansion bottom dead center) is set at P3.

In addition, the link ratios of the link mechanism 20 and the gear ratios of the power transmission structure 30 are set in such a manner that, when the carrier 68 rotates in the direction of arrow A2, the meshing phase γ is set at γ2 as shown in FIG. 3. With the meshing phase set at γ2, the steady operation (premixed compression self-ignition operation) can be selected.

As shown in FIG. 7, the bottom dead centers in the intake stroke and expansion stroke (intake bottom dead center and expansion bottom dead center) are set at the same position P4 in response to the meshing phase γ being at γ2 as above. Further, the top dead center of the piston 18 in the compression stroke (compression top dead center) of the piston 18 is set at a position P5, and the top dead center of the piston 18 in the exhaust stroke (exhaust top dead center) of the piston 18 is set at a position P6.

During the steady operation (premixed compression self-ignition operation) of the multilink-type internal combustion engine 10, as set forth above, the exhaust top dead center P6 can be set at an opposite position, with respect to the combustion chamber 15, from the compression top dead center P5 (more specifically, at a position lower than the compression top dead center P5).

Namely, in the steady operation the multilink-type internal combustion engine 10, the position of the top dead center of the piston 18 can be changed by the power transmission structure 30 adjusting the meshing phase γ.

Next, with reference to FIGS. 8 to 12, a description will be given about how the embodiment of the multilink-type internal combustion engine 10 is operated. To facilitate understanding of the top and bottom dead centers of the piston 18, the following description will be given assuming that the cylinder 13a is disposed in a vertical orientation.

Figure 8:
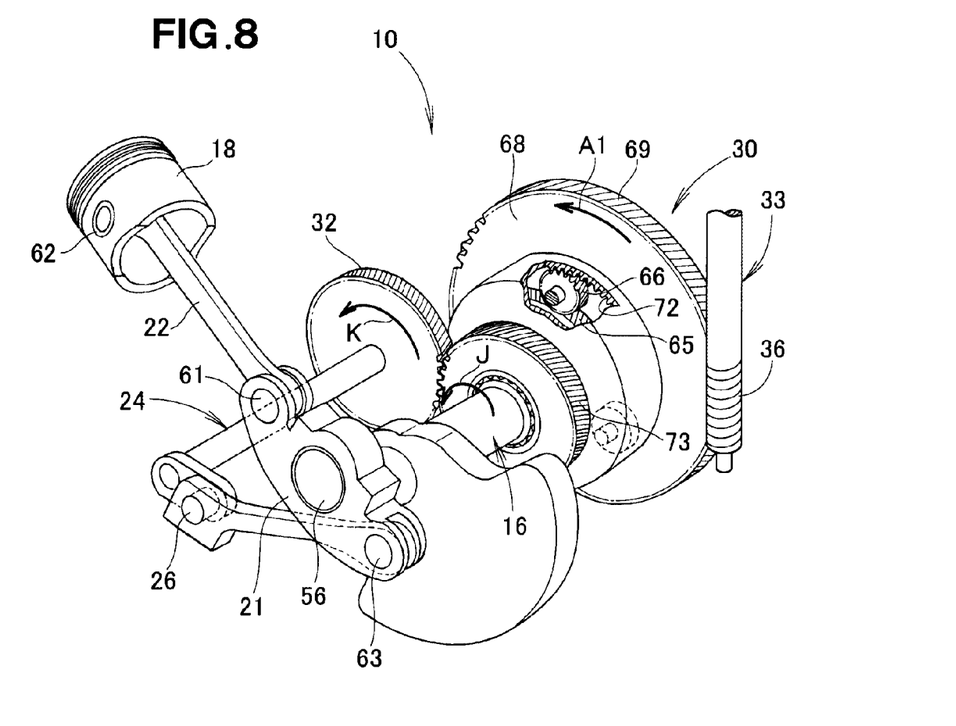
FIG. 8 is a perspective view explanatory of how the multilink-type internal combustion engine according to the embodiment of the present invention is adjusted to the spark ignition operation.
Figure 9:
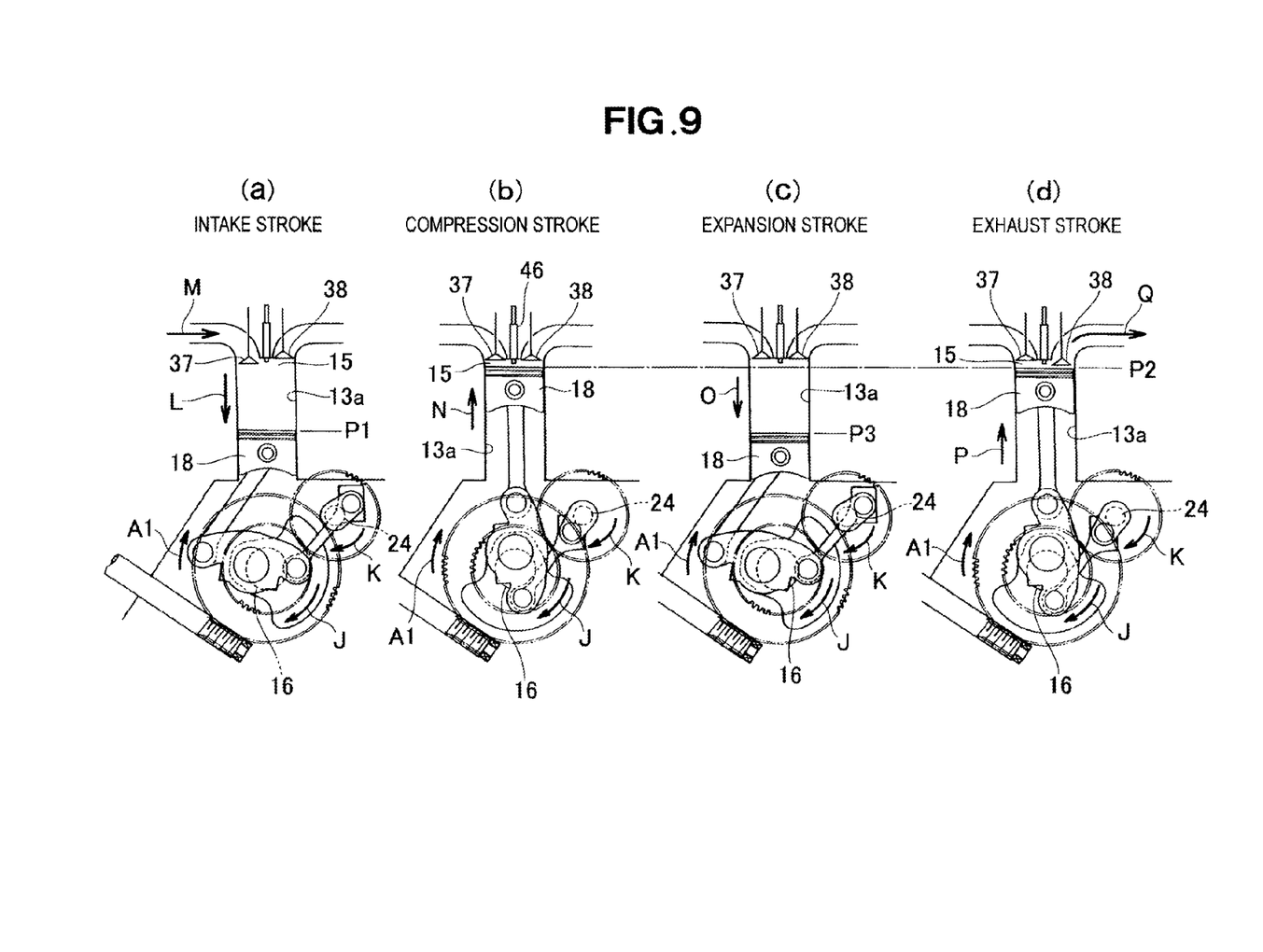
FIG. 9 is a view explanatory of how the multilink-type internal combustion engine according to the embodiment of the present invention behaves in the spark ignition operation.

First, the following describe, with reference to FIGS. 8 and 9, how the multilink-type internal combustion engine 10 behaves in the starting operation (i.e., spark ignition operation). The drive pinion 36 of the adjustment mechanism 33 is rotated during operation of the multilink-type internal combustion engine 10, in response to which the carrier 68 of the internal combustion engine 10 rotates in the direction of arrow A1 as shown in FIG. 8. Thus, the meshing phase γ of the driven gear 32 relative to the drive gear 73 changes to γ1 (see FIG. 7B), in response to which the multilink-type internal combustion engine 10 switches to the starting operation (i.e., spark ignition operation).

In the intake stroke, the crankshaft 16 continues to rotate as indicated by arrow J and the pivot shaft 24 continues to rotate as indicated by arrow K, as shown in (a) of FIG. 9. Also, the intake valve 37 is switched to the open position, the exhaust valve 38 is switched to the closed position, and the piston 18 descends to the intake bottom dead center P1 along the cylinder 13a as indicated by arrow L. Then, with the intake valve 37 kept in the open position, an air-fuel mixture is supplied to the combustion chamber 15 as indicated by arrow M.

Then, by the crankshaft 16 continuing to rotate as indicated by arrow J and by the pivot shaft 24 continuing to rotate as indicated by arrow K as shown in (b) of FIG. 9, the piston 18 of the internal combustion engine 10 switches from the intake stroke to the compression stroke.

In the compression stroke, the intake valve 37 and the exhaust valve 38 are switched to the closed position, and the piston 18 ascends from the intake bottom dead center P1 to the compression top dead center P2 along the cylinder 13*a* as indicated by arrow N. Once the piston 18 ascends to the neighborhood of the compression top dead center P2, the air-fuel mixture in the combustion chamber 15 is ignited (combusted) by the ignition plug 46.

Then, by the crankshaft 16 continuing to rotate as indicated by arrow J and by the pivot shaft 24 continuing to rotate as indicated by arrow K as shown in (c) of FIG. 9, the internal combustion engine 10 switches from the compression stroke to the expansion stroke.

In the expansion stroke, the intake valve 37 and the exhaust valve 38 are kept in the closed position, and the piston 18 descends from the compression top dead center P2 to the expansion bottom dead center P3 along the cylinder 13*a* as indicated by arrow O. The expansion bottom dead center P3 is located lower than the intake dead center P1.

Then, by the crankshaft 16 continuing to rotate as indicated by arrow J and by the pivot shaft 24 continuing to rotate as indicated by arrow K as shown in (d) of FIG. 9, the piston 18 of the internal combustion engine 10 switches from the expansion stroke to the exhaust stroke.

In the exhaust stroke, the intake valve 37 is kept in the closed position while the exhaust valve 38 is kept in the open position, and the piston 18 ascends from the expansion bottom dead center P1 to the exhaust top dead center P2 along the cylinder 13*a* as indicated by arrow P. With the exhaust valve 38 kept in the open position as above, the combustion gas in the combustion chamber 15 is discharged as indicated by arrow Q. The exhaust top dead center P2 is located at the same position as the compression top dead center P2.

In the starting operation (spark ignition operation), as set forth above, the air-fuel mixture is combusted by the ignition plug 46, and thus, the air-fuel mixture can be ignited in a stabilized manner even without use of heat energy of combustion gas. Because the air-fuel mixture can be ignited in a stabilized manner, it is possible to enhance an operating efficiency during the starting operation of the internal combustion engine 10.

During the spark ignition operation, the valve closing timing of the exhaust valve 38 in the exhaust stroke is set to occur when the piston 18 has reached the neighborhood of the exhaust top dead center P2. Further, the valve opening timing of the intake valve 37 in the intake stroke is set to occur immediately before the piston 18 reaches the exhaust top dead center P2. In addition, the exhaust top dead center P2 is located at the same position as the compression top dead center P2. In this way, the combustion gas can be discharged from the combustion chamber 15 without being caused to remain in the combustion chamber 15.

Figure 10:
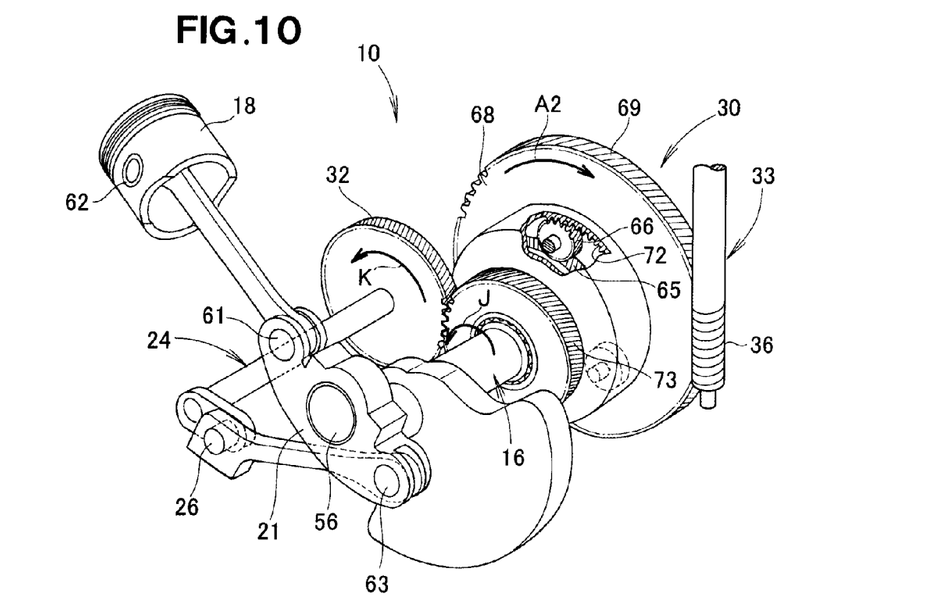
FIG. 10 is a perspective view explanatory of how the multilink-type internal combustion engine according to the embodiment of the present invention is adjusted to the premixed compression self-ignition operation.
Figure 12:
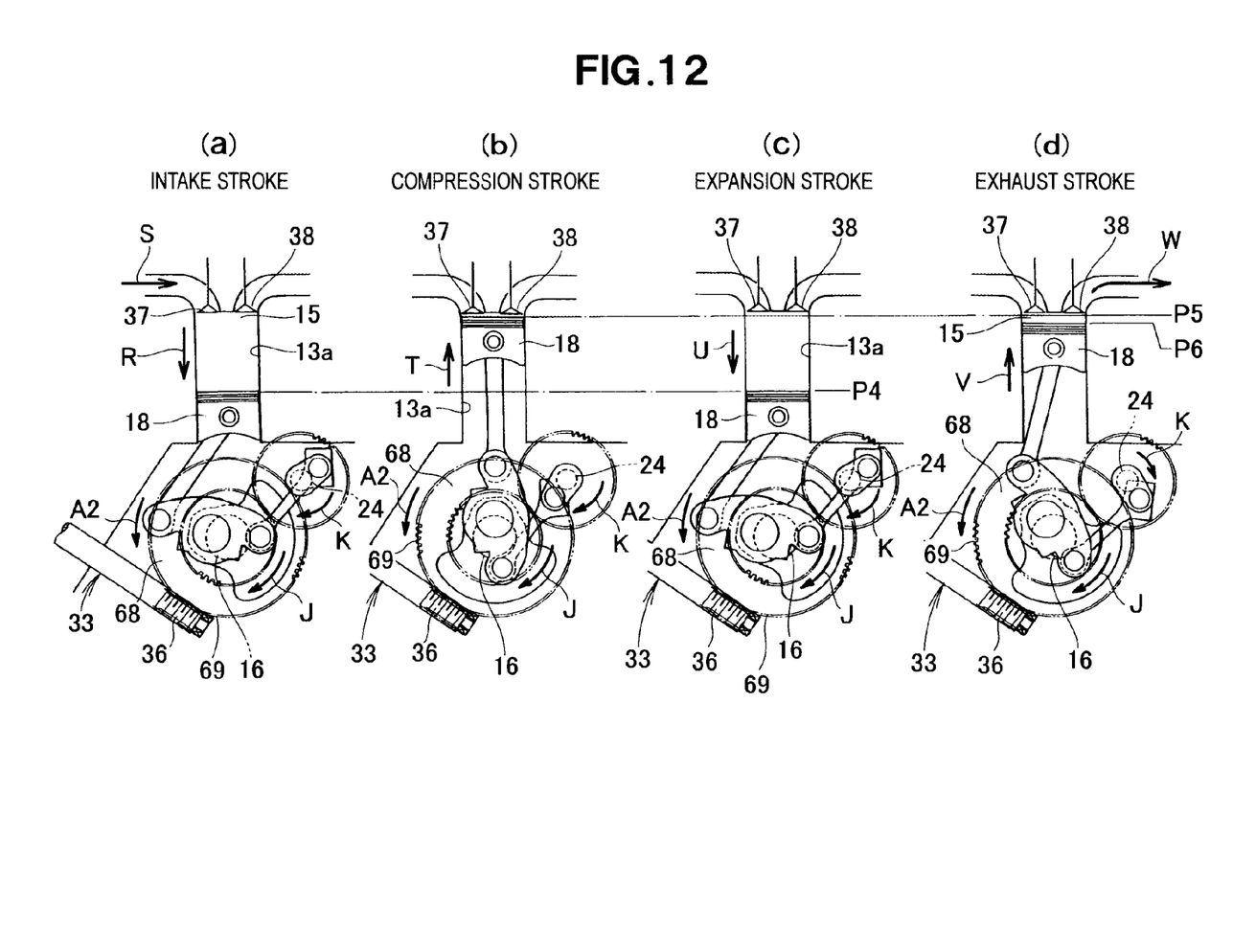
FIG. 12 is a view explanatory of how the multilink-type internal combustion engine according to the embodiment of the present invention behaves in the premixed compression self-ignition operation.

The following describe, with reference to FIGS. 10 and 12, how the multilink-type internal combustion engine 10 behaves in the steady operation (i.e., premixed compression self-ignition operation). FIG. 10 is a graph explanatory of the premixed compression self-ignition operation, where the vertical axis represents positions of the piston 18 while the horizontal axis represents crank angles.

As shown in FIG. 10, in response to the drive pinion 36 being rotated in the reverse direction with the crankshaft 16 rotating as indicated by arrow J, the carrier 68 rotates as indicated by arrow A2. Thus, the meshing phase γ of the driven gear 32 relative to the drive gear 73 changes to γ2 (see FIG. 7B), in response to which the multilink-type internal combustion engine 10 switches to the steady operation (i.e., premixed compression self-ignition operation).

Figure 11:
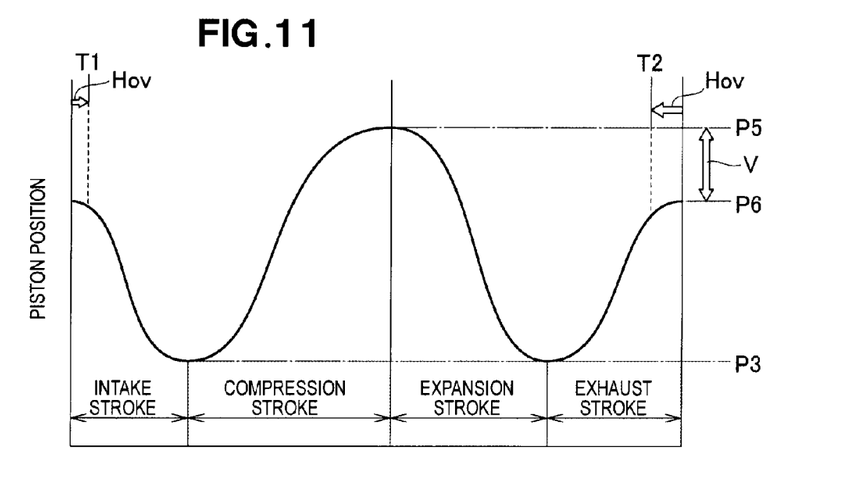
FIG. 11 is a graph explanatory of how the multilink-type internal combustion engine according to the embodiment of the present invention behaves in the premixed compression self-ignition operation.

Further, in the intake stroke, as shown in FIG. 11 and (a) of FIG. 12, the crankshaft 16 continue to rotate as indicated by arrow J, and the pivot shaft 24 continues to rotate as indicated by arrow K. The intake valve 37 is switched to the open position while the exhaust valve 38 is switched to the closed position, and the piston 18 descends to the intake bottom dead center P4 along the cylinder 13*a* as indicated by arrow R.

In the premixed compression self-ignition operation, the valve opening timing T1 of the intake valve 37 is retarded, and an air-fuel mixture is supplied to the combustion chamber 15 as indicated by arrow S by the thus-retarded intake valve 37 being kept in the open position.

By the crankshaft 16 continuing to rotate as indicated by arrow J and by the pivot shaft 24 continuing to rotate as indicated by arrow K, the piston 18 of the internal combustion engine 10 switches from the intake stroke to the compression stroke, as shown in FIG. 11 and (b) of FIG. 12. In the compression stroke, the intake valve 37 and the exhaust valve 38 are switched to the closed position, and the piston 18 ascends from the intake bottom dead center P3 to the compression top dead center P5 along the cylinder 13*a* as indicated by arrow T. During the premixed compression self-ignition operation, the compression top dead center P5 is set higher (closer to the combustion chamber 15) than the compression top dead center P2 set during the spark ignition operation. The air-fuel mixture is ignited spontaneously by the piston 18 ascending to the compression top dead center P5 to thereby compress the air-fuel mixture with a high compression ratio.

By the crankshaft 16 continuing to rotate as indicated by arrow J and by the pivot shaft 24 continuing to rotate as indicated by arrow K, the piston 18 of the internal combustion engine 10 switches from the compression stroke to the expansion stroke, as shown in FIG. 11 and (c) of FIG. 12. In the expansion stroke, the intake valve 37 and the exhaust valve 38 are switched to the closed position, and the piston 18 descends from the compression top dead center P5 to the expansion bottom dead center P4 along the cylinder 13*a* as indicated by arrow U. The expansion bottom dead center P4 is located at the same position as the intake bottom dead center P4.

By the crankshaft 16 continuing to rotate as indicated by arrow J and by the pivot shaft 24 continuing to rotate as indicated by arrow K, the piston 18 of the internal combustion engine 10 switches from the expansion stroke to the exhaust stroke, as shown in FIG. 11 and (d) of FIG. 12. In the exhaust stroke, the intake valve 37 is kept in the closed position while the exhaust valve 38 is kept in the opened position, and the piston 18 ascends from the expansion bottom dead center P3 to the exhaust top dead center P6 along the cylinder 13*a* as indicated by arrow V. With the exhaust valve 38 kept in the open position as above, the combustion gas in the combustion chamber 15 is discharged as indicated by arrow W.

In the premixed compression self-ignition operation, the valve closing timing T2 of the exhaust valve 38 is advanced. Further, the valve opening timing T1 of the intake valve 37 is retarded in the intake stroke. Thus, the so-called "negative overlap" state where the both of the intake valve 37 and the exhaust valve 38 are closed can be secured in a time period Hov. Further, in the premixed compression self-ignition operation, the exhaust top dead center P6 can be set lower than the compression top dead center P5 (at an opposite position, with respect to the combustion chamber 15, from the compression top dead center P5).

With the negative overlap state secured in the time period Hov and with the exhaust top dead center P6 set at a lower position than the compression top dead center P5 as noted above, a part of the combustion gas is caused to remain in a residual gas space V between the compression top dead center P5 and the exhaust top dead center P6. Further, with the exhaust top dead center P6 set at a lower position than the compression top dead center P5, it is possible to prevent the piston 18 from compressing the residual combustion gas in the exhaust stroke and thereby prevent a load (stress) from being generated on the piston 18 from the residual combustion gas. In this way, it is possible to suppress friction from being produced in the interior (particularly, sliding portions) of the multilink-type internal combustion engine 10 due to a load (stress) generated on the piston 18.

In addition, because the piston 18 can be prevented from compressing the residual combustion gas in the exhaust stroke, it is possible to suppress temperature increase of the residual combustion gas. Thus, it is possible to keep small a temperature difference between the residual combustion gas and the wall of the cylinder 13a and minimize heat loss from the cylinder 13a (wall of the cylinder 13a). In this way, heat energy of the residual combustion gas of the combustion chamber 15 can be used efficiently for spontaneous ignition (combustion)

In addition, the compression top dead center P5 during the premixed compression self-ignition operation is set higher than (closer to the combustion chamber 15) than the compression top dead center P2 during the spark ignition operation (see FIG. 9). By using the heat energy of the residual combustion gas and setting the compression top dead center P5 during the premixed compression self-ignition operation at a higher position, it is possible to spontaneously ignite the air-fuel mixture in a stabilized manner. Namely, the spontaneous ignition (self-ignition) timing of the air-fuel mixture can be stabilized.

Because the spontaneous ignition timing of the air-fuel mixture can be stabilized and friction can be suppressed from being produced in the interior (particularly, sliding portions) of the multilink-type internal combustion engine 10, it is possible to enhance the operating efficiency of the internal combustion engine 10 during the premixed compression self-ignition operation (i.e., steady operation).

The multilink-type internal combustion engine 10 of the present invention is not limited to the above-described embodiment and may be modified variously. For example, the shapes and constructions of the multilink-type internal combustion engine 10, crankshaft 16, piston 18, connection link 21, con rod 22, swing rod 23, pivot shaft 24, power transmission structure 30, planet gear mechanism 31, driven gear 32, adjustment mechanism 33, sun gear 65, carrier 68, ring gear 72, drive gear 73, etc. are not limited to those shown and described above and may be modified variously.

The basic principles of the present invention are well suited for applications to multilink-type internal combustion engines where a connection link is mounted on a crankshaft and a piston and a pivot shaft are connected with the connection link.

Obviously, various minor changes and modifications of the present invention are possible in light of the above teaching. It is therefore to be understood that within the scope of the appended claims the invention may be practiced otherwise than as specifically described.

What is claimed is:

1. A multilink-type internal combustion engine in which a connection link is pivotably mounted on a crankshaft and connected at one end portion thereof to a piston via a con rod and at another end portion thereof to a pivot shaft via a swing rod, and which includes a power transmission structure capable of transmitting rotation of the crankshaft to the pivot shaft, the power transmission structure comprising:
a planet gear mechanism having a sun gear mounted on the crankshaft;
a drive gear provided on a ring gear section of the planet gear mechanism;
a driven gear meshing with the drive gear and mounted on the pivot shaft; and
an adjustment mechanism for switching a rotation direction of a carrier of the planet gear mechanism to thereby adjust a meshing phase of the driven gear relative to the drive gear.

2. The multilink-type internal combustion engine of claim 1, wherein the adjustment mechanism adjusts the meshing phase in such a manner that, during starting operation of the internal combustion chamber, an exhaust top dead center in an exhaust stroke of the piston is set at a same position as a compression top dead center in a compression stroke of the piston, and that, during steady operation of the internal combustion engine, a compression top dead center in the compression stroke of the piston is set at a position closer to a combustion chamber than the compression top dead center set during the starting operation, but also an exhaust top dead center in the exhaust stroke of the piston is set at a lower position, with respect to the combustion chamber, from the compression top dead center set during the steady operation.

* * * * *